UNITED STATES PATENT OFFICE.

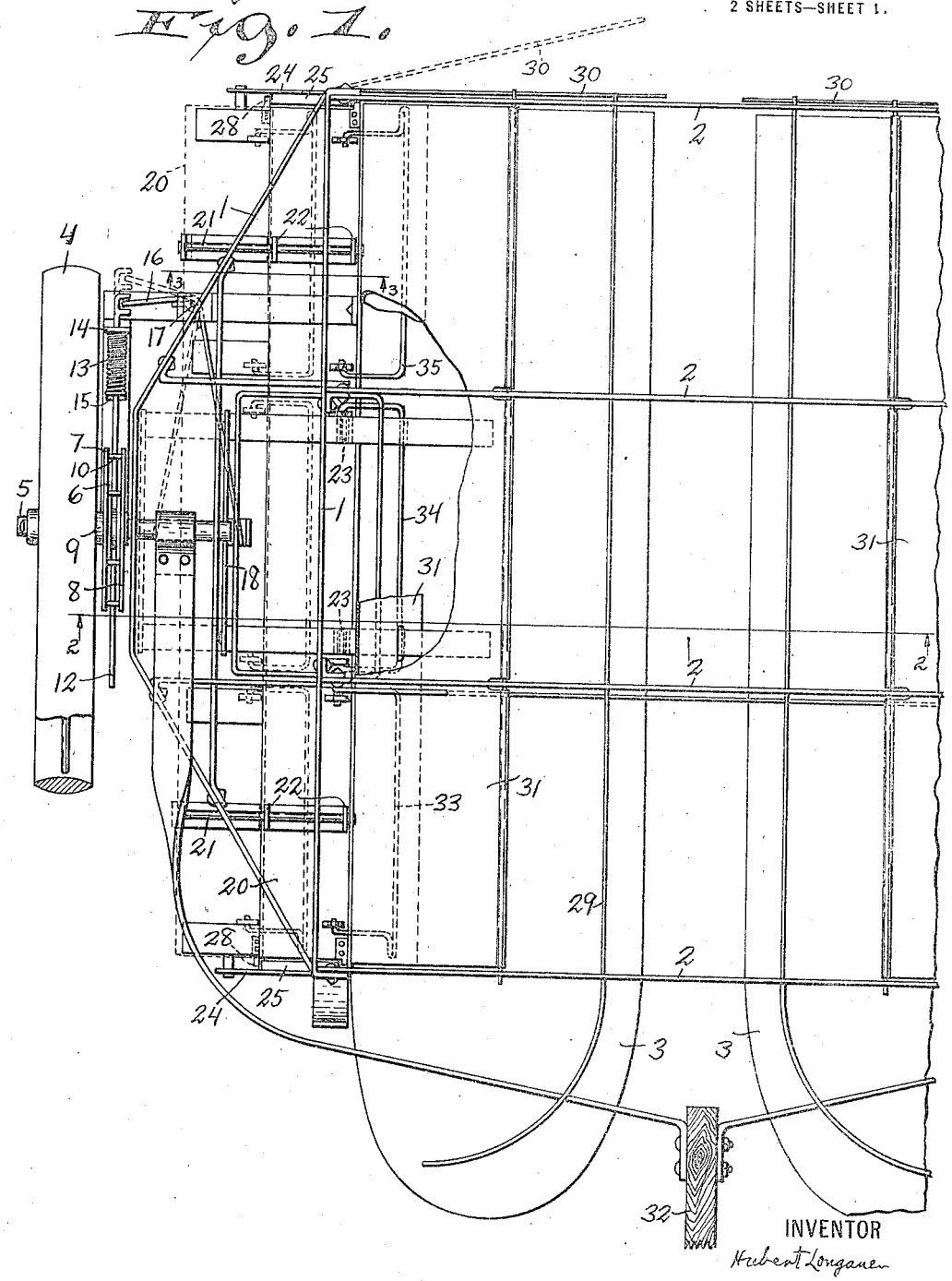

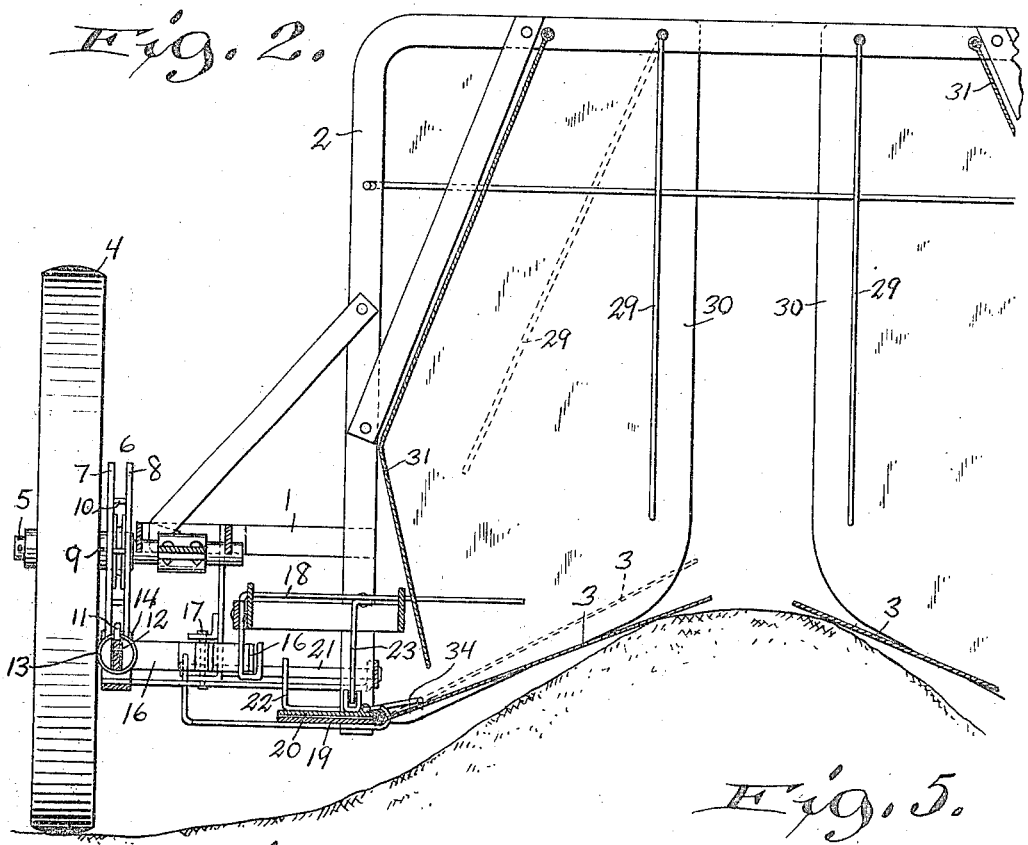

HUBERT LONGAUER, OF LYNDON STATION, WISCONSIN.

EXTERMINATOR.

1,239,799.   Specification of Letters Patent.   Patented Sept. 11, 1917.

Application filed May 21, 1917. Serial No. 169,850.

*To all whom it may concern:*

Be it known that I, HUBERT LONGAUER, a citizen of the United States, residing at Lyndon Station, in the county of Juneau and State of Wisconsin, have invented certain new and useful Improvements in Exterminators, of which the following is a specification, reference being had to the accompanying drawings, forming a part thereof.

This invention relates to exterminators, and the object of the invention is to provide an exterminator which is capable of being used to exterminate worms, bugs and so forth, from growing plants, vines or bushes. As the exterminator is capable of being used with many varieties of plants, vines and bushes, the general term vegetation will be employed in this specification and the claims, to designate any vegetable growth with which the exterminator may be used, and as the exterminator may be used to exterminate many varieties of worms, bugs and insects, they will be generally designated in the specification and claims by the common term insects.

The exterminator is of special advantage in destroying potato bugs, which infest potato plants.

Briefly described, the exterminator comprises means for collecting insects from vegetation and for automatically exterminating the insects.

Referring to the drawings which accompany this specification and form a part hereof, which drawings illustrate an embodiment of this invention, and on which drawings the same reference characters are used to designate the same elements wherever they may appear in each of the several views, Figure 1 is a plan view of part of a double exterminator; Fig. 2 is a vertical transverse section on the line 2—2, on Fig. 1, looking in the direction indicated by the arrows; Fig. 3 is a vertical transverse section taken on the line 3—3, on Fig. 1, looking in the direction indicated by the arrows; Fig. 4 is a view similar to Fig. 3 but showing parts in different positions; and Fig. 5 is an elevation of details of construction, a part being broken away.

The exterminator illustrated by the drawings is a double machine which can be used to straddle a row of vegetation in a manner which will be readily understood from inspection of Fig. 2 of the drawings, and as both sides of the machine are duplicates, a description of the mechanism of one side of the machine will be sufficient.

Referring to the drawings, the reference numeral 1 designates a frame work which may be constructed and arranged in any suitable manner. As illustrated by the drawings, this frame work is composed of a plurality of U-frames 2, which are arched upwardly to a sufficient height to clear the vegetation, and which are secured together and braced in a suitable manner, as clearly shown by the drawings. Collecting plates 3 are hinged to the frame 1, so that they can adapt themselves to the inequalities of the ground and can adapt themselves to the slopes of the hills or rows in which the vegetation is growing. The front ends of these collecting plates 3 may be bent upward more or less, to prevent their catching and digging into the soil. Preferably the frame work 1 is supported by wheels 4, which not only reduce the power necessary for moving the exterminator, but also act as power elements for intermittently actuating the automatic exterminator mechanism to be hereinafter described. The wheels 4 are provided with axles 5, to which are secured actuating mechanisms 6. These actuating mechanisms may be of any suitable form or construction, and the drawings illustrate a simple form composed of two disks 7 and 8, which are firmly secured to a hub 9 of a wheel 4 so as to rotate with the wheel. The disks 7 and 8 are united by a plurality of pins 10, which are adapted to contact with a projection 11 on a longitudinal rod 12, whereby as a wheel 4 is rotated, the longitudinal rod 12 will be reciprocated until the pin 10 is disengaged from the projection 11, as shown in dotted lines on Fig. 5 of the drawings. The longitudinal rod 12 is supported by the frame work 1 of the machine in such a manner that it can only be moved in one direction by a pin 10, as will be clearly understood from an inspection of the drawings. A spring 13 is illustrated as surrounding the longitudinal rod 12, and bears against a guide 14 at one end and a pin 15 secured to the longitudinal rod 12 at its opposite end. It will thus be seen that as a wheel 4 is rotated, each pin 10 will reciprocate the longitudinal rod 12 in one direction, and the spring 13 will return the longitudinal rod 12 to its initial position, ready to be acted upon by the next succeeding pin 10. A bell crank lever 16, secured upon a pivot 17, has one end engaged with the longitudinal rod 12 and its other end engaged with a sliding frame 18, which is supported by the frame work 1 of the machine, so that it can be reciprocated transversely of the machine by the bell crank lever 16 in a manner which will be readily understood from an inspection of the drawings. A bed plate 19 is rigidly secured to the frame work 1, and preferably as low down as possible and extends longitudinally the entire length of the machine. Above the bed plate 19 is located the crusher plate 20. Guides 21 are firmly secured to the frame work 1, and the crusher plate 20 is provided with arms 22, which are provided with vertical slots to receive the guides 21. This construction permits the crusher plate 20 to be moved parallel with the bed plate 19, and also to be moved up and down with respect to the bed plate 19. An arm 23, secured to the sliding frame 18, is loosely engaged with the crusher plate 20, so that as the sliding frame 18 is reciprocated by the bell crank lever 16, the crusher plate 20 will also be reciprocated transversely of the machine, and can be raised or lowered with respect to the bed plate 19, in a manner hereinafter described.

In the operation of the exterminator the insects are collected, in a manner to be hereinafter described, upon the bed plate 19, and are crushed by the crusher plate 20 descending upon them. The crusher plate 20 is then moved outwardly transversely of the machine, and grinds and crushes the insects and throws them clear of the machine. On the inward movement or return movement of the crusher plate 20 it is elevated vertically above the bed plate 19 until it has reached the limit of its inward movement, and then it is brought down upon the bed plate 19 or the insects thereon. This movement is accomplished by the following mechanism:

A plate 24 provided with an inclined cam member 25, is secured to a part of the frame work 1 by a pivot 26. This plate 24 and the inclined cam member 25 are kept depressed ordinarily by a spring 27. Projections 28 are provided at the inner ends of the crusher plate 20 and are adapted to slide under the inclined cam members 25 when the crusher plate 20 is moved outward, and to ride over the tops of the inclined cam members 25 when the crusher plate is moved inward. The inclined cam members 25 are shorter than the extent of movement of the crusher plate 20, so that the projections 28 will clear the inclined cam members 25 at both limits of movement of the crusher plate 20. It will be clear from an inspection of Figs. 3 and 4 of the drawings, that with this construction, when the crusher plate 20 is moved outwardly it will be in contact with the bed plate 19 or insects thereon, while it will be elevated above the bed plate 19 as it is moved inwardly until it reaches its inward limit of movement. At this time it will be freed from the inclined cam members 25 and will drop upon the bed plate 19 or the insects thereon.

Beaters 29 are supported from the U-frames 2, to strike against the vegetation and knock the insects therefrom on to the collecting plates 3. These beaters may be constructed in any suitable manner, and those illustrated by the drawings are simply loosely hanging frames of rod or wire, which extend longitudinally of the exterminator, as clearly shown by the drawings. Transverse beaters 30, may also be provided to dislodge the insects, and they may be located wherever they are thought to be desirable. Preferably the transverse beaters 30 are located at the rear end of the exterminator, and consist of light doors, which are hinged in a vertical position and may be provided with light springs, not shown, which tend to keep them in their closed positions, but which permit them to yield outwardly when slight resistance is offered. By making these transverse beaters as doors, they act as paddles to throw the insects dislodged by them into the exterminator, on the collecting plates 3. Guards or casings 31 may be provided along the sides of the exterminator to insure the insects dislodged from the vegetation dropping upon the collecting plates 3.

The exterminator may be propelled in any suitable manner, either manually or by animal or other power, by means of a pole 32, for example.

The reference numerals 33, 34 and 35 designate scrapers which are loosely hinged to the crusher plate 20 and scrape the insects from the collecting plates 3 on to the bed plates 19 when the crusher plates are moved outwardly, as will be readily understood from an inspection of Figs. 1 and 2 of the drawings.

What is claimed is:

1. The combination in an exterminator, of a frame work, a beater, a collecting plate, a crusher plate, means for causing the crusher plate to rise and fall and means for intermittently actuating the crusher plate.

2. The combination in an exterminator, of a frame work, a beater, a collecting plate, a bed plate, a crusher plate, and means for intermittently withdrawing the crusher plate from the bed plate and returning it thereagainst.

3. The combination in an exterminator, of a frame work, a beater, a collecting plate, a bed plate, a crusher plate, a wheel, actuating mechanism secured to said wheel, means actuated by said actuating mechanism for transversely reciprocating said crusher plate, and means for elevating said crusher plate above said bed plate as it is being moved in one direction with respect thereto.

4. The combination in an exterminator, of a frame-work, a beater, a collecting plate, a bed plate, a crusher plate, a wheel, actuating mechanism secured to said wheel, means actuated by said actuating mechanism for transversely reciprocating said crusher plate, a scraper, and means for elevating said crusher plate above said bed plate as it is being moved in one direction with respect thereto.

In witness whereof I hereto affix my signature.

HUBERT LONGAUER.

Copies of this patent may be obtained for five cents each, by addressing the "Commissioner of Patents, Washington, D. C."